United States Patent Office 3,260,691
Patented July 12, 1966

3,260,691
COATING COMPOSITIONS PREPARED FROM CONDENSATION PRODUCTS OF AROMATIC PRIMARY DIAMINES AND AROMATIC TRICARBOXYLIC COMPOUNDS
Edward Lavin, Longmeadow, Albert H. Markhart, Wilbraham, and James O. Santer, Springfield, Mass., assignors, by mesne assignments, to Monsanto Company, a corporation of Delaware
No Drawing. Filed May 20, 1963, Ser. No. 281,784
5 Claims. (Cl. 260—30.2)

This invention relates to coating compositions which can be heat cured to insoluble, infusible, flexible, tough, adherent, heat resistant and dielectric materials; more particularly, it relates to the condensation products of certain aromatic tricarboxylic compounds and certain aromatic diamino compounds.

The use of synthetic resins in electrical insulation is not new. In fact, many have found wide commercial acceptance in such applications as, for instance, magnet wire coating. In that process, wire of an appropriate gauge is first successively covered by means of a specialized technique with multiple layers of one or more enamels. The covered wire is then wound into coils for incorporation into motors, generators and the like. Prior to final assembly however, the stator and rotor coils are dipped into special varnishes which when baked will form a firmly binding envelope and will, in addition, often contribute to the total insulation of the system.

For the convenience of the trade and in reference to the operating temperatures to which the enameled wire coils are ultimately destined, a classification has been developed and applied to such enamels (American Institute of Electrical Engineers, Insulation classification No. 1, June 1957). These classes range from 90° C. to 220° C. A class 220° C. enamel for instance, will be employed in equipment designed for use at temperatures of 220° C. or higher. It is with this particular enamel class that the present invention is primarily concerned.

The introduction of synthetic organic resins in enamels of this 220° C. class is a rather recent development in the art. Yet, because of an excellent balance of properties as compared to the inorganic materials constituting the bulk of the class, the new materials are already used extensively.

The use of polyamide resins in this sort of application has been attended by several serious difficulties. Aliphatic polyamides, for instance, suffer from poor oxidative stability. Aromatic polyamides, on the other hand, behave better in this respect but then their poor solubility and their high melting point render them rather difficult to process. In addition, the most widely used polyamides are not readily crosslinked, i.e., converted into the insoluble, infusible and yet flexible solid state that must be obtained in order to achieve the performance demanded of wire insulation.

Accordingly, the primary object of this invention is to provide a readily soluble aromatic polyamide that is of easy application by virtue of its solubility. Another object is to provide polyamide compositions that can be cured into insoluble, infusible, flexible, thermally and oxidatively stable products.

These and other objects which will become evident in the course of the present disclosure have been accomplished by the formation of new polyamide resins that are the condensation products of a tricarboxylic compound having the general formula

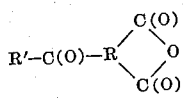
(I)

with a diamino compound, $H_2N-R''-NH_2$ (II). In these formulae, R stands for a trivalent aromatic radical, R' may be a hydroxyl group or a monovalent halogen atom and R'' represents a divalent aromatic radical. Upon condensation of these monomers, there is obtained, taking the monoacid chloride of trimellitic anhydride and diaminodiphenyl methane as typical monomers, a polymer having the following recurring structural unit

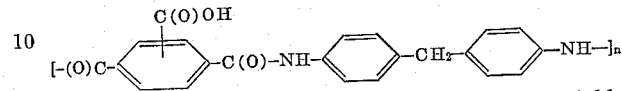

Heat curing of these materials yields infusible, insoluble and flexible resins through the formation of intra-chain and inter-chain amide and imide linkages as well as other possible linkages depending on the particular amino compound present.

The following examples will serve to illustrate but not to limit the invention.

Example 1

Trimellitic anhydride monoacid chloride (90.0 g., 0.43 mol) and methylene dianiline (86.4 g., 0.43 mol) were thoroughly mixed in a glass jar. A mixture of N-methyl pyrrolidone (210 g.) and triethylamine (43.2 g., 0.43 mol) was added with vigorous stirring. The solids dissolved rapidly and the temperature rose to about 90° C. Stirring continued for about one hour while the solution cooled to about 50° C. At this point, the product was diluted with a mixture of N-methyl pyrrolidone (37 g.) and xylene (124 g.). After standing overnight, the solution was filtered to remove the triethylamine hydrochloride.

The product was diluted once more to a 12% by weight content of polymeric solids with a 2:1 mixture of N-methyl pyrrolidone and xylene.

Example 2

The polyamide solution of Example 1 was applied to AWG No. 18 (0.0403 inch) copper wire by conventional wire coating means, each layer of enamel being cured by passing the dipped wire through a vertical oven of twelve feet with a set cut temperautre of 390° C. The wire speed through the oven was maintained at a constant rate of 8 feet per minute. Six successive coats of the enamel were applied to the wire in this manner, thus giving it a "heavy build," i.e., a diameter approximately 3 mils larger than it originally had.

Wire so insulated was found to possess the following excellent characteristics:

Wrap, 25% elongation _____ 3×
Abrasion, 700 g., strokes _____ 69/49
Cut-thru, ° C. _____ 370
Heat Shock, 300° C. _____ 1×
Dielectric life, 300° C., 1 kv., hours _____ 178
Dielectric breakdown, dry, v. _____ 3890
Dielectric breakdown, wet, v. _____ 1410

The testing of the wire which gave these results was carried out according to standard procedures which are well described in publications of the American Standards Association, the National Electrical Manufacturers Association, the American Institute of Electrical Engineers, and in military specifications. The description of these tests will therefore be limited here to essential details and will include of course any modification applied to them.

The wrap test provides an indication of the flexibility and of the adherence of the coating. The coated wire is stretched to achieve a 25% elongation and is then wrapped around a mandrel for greater elongation of the outer side of the wrapped wire. The diameter of the smallest mandrel around which the wire can be wrapped without cracking or rupturing is reported in terms of wire diameters "X."

*The abrasion test* consists essentially in scraping repeatedly the insulated wire sample with a steel needle loaded with a set weight which is varied according to the build of the wire, 700 g. in this case. The tester records the number of strokes and shuts off when contact is made between the needle and the bared wire. Insulation which withstands an average of 30 strokes in six different places is considered standard provided that not one place wears down with less than 15 strokes. The results given are the average number of strokes and the minimum number of strokes actually found necessary to wear down the coating.

*The cut-thru test* is a measure of the thermoplasticity of the coating. A constant pressure is applied at a 90° cross-over of two pieces of the coated wire by means of a spindle and weight. A potential difference of 12 volts is maintained between the two wires. The temperature is gradually raised until contact occurs. This is the temperature reported.

*The heat shock test* measures the resistance to cracking of stressed magnet wire coatings when heated. The coated wire is wound ten turns about itself (1×), ten turns about a mandrel twice its diameter (2×), and ten turns about one thrice its diameter (3×). The sample is then heated for one hour in an oven at the temperature indicated (300° C. here). The diameter of the smallest mandrel over which no crack has developed in the insulation is reported.

*The dielectric life test* or the *1 kv.-life test* measures the period for which a coating can be exposed at the particular temperature mentioned (300° C. here) before it will fail as electrical insulation upon the application of 1000 volts for one second to the sample. Ten samples are used in each test. The heating period is reported in hours.

*The dielectric breakdown test* indicates the maximum voltage that an intimately twisted pair of coated wires can withstand without arcing. In the dry version of the test, the twisted wire pair is placed in a desiccator over well-dried silica gel for at least 23 hours and tested within three minutes after removal from said desiccator. In the wet test, the twisted strands are submerged in distilled water for at least 23 hours, wiped free of water drops and tested within three minutes of removal.

*Example 3*

A 15% solids by weight solution of the polymer of Example 1 in the same solvent mixture was applied to coils of enameled magnet wire similar to those which form the windings of electrodynamic machines. The bond strength of the varnish envelope formed after baking the coated coils was found to average 36 lbs./mil thickness at room temperature, 11.5 lbs. at 180° C. and 5 lbs. at 225° C. These results compare favorably with the bond strengths of commercial silicone coil varnish at the same temperatures, namely 30 lbs., 1 lb. and 0 lb. respectively.

The varnishing procedure and the bond strength determination employed can be described as follows:

*Varnishing wire coils.*—The method used is an adaptation of that published by John Dexter in "Insulation," September 1955, page 12.

The enameled wire samples are heat annealed for one hour at 200° C. The annealed wire is then closely wound on a ¼ inch diameter mandrel and cut into 3¾ inch long sections. These sections are dipped in the varnish and dried two hours at 100° C. and two hours at 175° C. Another reverse dip follows with the same drying cycle. A film build increase of 1 to 2 mils is accomplished in this manner. The varnished coils are finally cured for four hours at 225° C.

*Bond strength determination.*—In this test, the varnished lengths of coil are laid flat on two fixed supports which are approximately two inches apart and a measured force is applied downwards on the coil until the coil breaks. Since the unvarnished coil's resistance to this treatment is negligible, the force needed to break the coils is essentially a measure of the flexural breaking strength of the cured varnish envelope. The test procedure is carried out with an Instron tester. A minimum flexural breaking strength of 5 lbs./mil of varnish thickness is considered acceptable for the purposes of this invention.

Bond strength is determined at room temperature and at higher temperatures. In the latter cases, the length of coil is heated by electrical current, the temperature being measured by a thermocouple pyrometer system. Once the desired temperature is reached, the bond strength is determined.

*Example 4*

A polyamide solution prepared according to Example 1 was applied to steel panels and baked for 120 minutes at 150° C. to give a coating about 0.002 inch thick. The hardness and the abrasion resistance of the coatings was measured by standard tests before and after the indicated periods of aging at 250° C. Results obtained for a commercial silicone varnish, without aging, are given for comparison.

| Test | Varnish | | | |
| --- | --- | --- | --- | --- |
| | Example 1 | | | Silicone |
| | Aging at 250° C. | | | |
| | None | 64 hrs. | 100 hrs. | None |
| Sward Hardness (cycles) | 48 | 48 | 45 | 22 |
| Abrasion Resistance (weight loss/1,000 rev.), mg. | 3 | 8 | 10 | 806 |
| Shear Hardness (force to penetrate), g. | 350 | 300 | 420 | 105 |

The improved properties of the cured polyamide coating over those of the commercial silicone varnish are evident. The excellent thermal stability of the coating as measured after aging at high temperature for significant periods is notable.

The tensile strength of a free film obtained from a polyamide solution of this invention and cured in the usual manner was found to be 11,300 p.s.i. as measured on a strip ½ inch wide and 1.2 mils thick.

As indicated earlier, the enamels of this invention are made from at least one compound selected from each of two classes of monomers, i.e., an aromatic tricarboxylic compound and an aromatic diamino compound.

Useful tricarboxylic compounds include aromatic acid derivatives containing at least one pair of carboxyl groups in ortho position with respect to each other or otherwise situated in a fashion which permits the formation of an anhydride structure, one other carboxyl group and from 9 to 18 carbon atoms. Within these limits, these compounds may contain one or more benzenoid rings such as, for instance, trimellitic anhydride and its isomers and multi-ring compounds such as the 1,8-anhydride of 1,3,8-tricarboxylnaphthalene. The general formula of the usable carboxylic components of the present coating compositions is

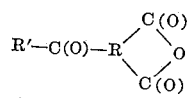

wherein R is a radical selected from the class consisting of trivalent radicals of benzene, naphthalene, biphenyl, diphenyl ether, diphenyl sulfide, diphenyl sulfone, diphenyl amine, ditolyl ether, benzophenone and the like, and R' is selected from the class consisting of the —OH, F-, Cl- and Br- groups.

In order to obtain the properties required by the compositions of the invention, the selection of the necessary diamino compound must be restricted to purely aromatic primary diamines containing from 6 to about 25 carbon atoms. Included in this class are the phenylene diamines and two-ring compounds such as diaminobiphenyl, diaminodiphenyl ether, diaminodiphenyl sulfide, diaminodiphenyl sulfone, diaminoditolyl ether and diaminodiphenyl substituted lower alkane such as methane and propane. Other useful diamino compounds are 4,4-thioaniline diphenyl ether, 4,4′-diaminotriphenylamine, and so on. Mixtures of these amines may also be employed.

It is not inconsistent with this invention to incorporate in small amounts polyamino compounds such as triaminobenzene as well as other polyfunctional compounds which lead to greater crosslinking of the polymeric chains on curing. These additives should preferably be added after the formation of the polyamide.

The proportions of tricarboxylic compound and of diamino compound in these preparations can vary from about a 5% molar excess of the former to about a 70% molar excess of the di-primary amine. Chemical equivalence is favored however where maximum linearity and therefore solubility is desired in the polyamide product. Similarly, a polyamide which is primarily linear will be obtained if the temperature of the reaction mixture is not allowed to rise over 60° C. for any significant length of time. Useful solvents in which to prepare the solutions of this invention include cresol, toluol, dimethylacetamide, dimethylformamide, N-methyl pyrrolidone, high boiling petroleum hydrocarbons and various mixtures thereof. The Brookfield viscosity of the polyamides should range between 100 and 5000 centipoises in 15% by weight solutions in a 1:1 mixture of N-methyl pyrrolidone and dimethylacetamide at 25° C.

The coatings of this invention can be cured to insoluble and infusible products at any temperature between 125° C. and 500° C. The actual temperature selected will depend on the heat resistance of the substrate coated, the time of cure desired, the cost factor in operating high temperatures ovens, the type of equipment employed, e.g., wire enameling towers, the flexibility and strength that the cured resin need achieve and the particular monomers employed. In general, the range of 150° C. to 225° C. will be most economical for the majority of possible applications with the exception of magnet wire coating where the conventional equipment operates within the range of 200° C. to 500° C.

The polymeric solutions of this invention can be used, as shown in the examples, in electrical insulation, in protective surface coating and for the formation of free film. Their nature and properties however will recommend them to those skilled in the art for many other applications. They may be used as structural adhesives and in the formation of fibers and molded products. They may be used by themselves or in conjunction with other natural and synthetic resins, such as phenol-aldehyde precondensates and silicones. They may serve as overcoating and undercoating to other resins such as polyvinyl formal, polyesters and the like. In general, it is evident that their excellent properties such as ease of application, stability on storage, as well as the remarkable heat resistance, dielectric resistance and excellent adhesion of the cured products will suggest many other unmentioned uses.

What is claimed is:

1. A soluble polyamide that is the polymeric condensation product of an aromatic primary diamino compound containing from 6 to about 25 carbon atoms selected from the group consisting of phenylene diamines, diphenylene diamines, triphenylene diamines, ditolyl diphenylene diamines, and derivatives of the foregoing two ring comamines, wherein the aromatic nuclei are connected with pounds, wherein the aromatic nuclei are connected with divalent members selected from the class consisting of oxygen, sulfur and alkylene radicals, wherein the alkylene radical contains from 1 to 3 carbon atoms with a tricarboxylic compound containing from 9 to about 18 carbon atoms and having the formula:

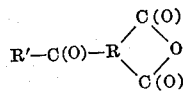

wherein R is a trivalent aromatic radical and R′ is selected from the group consisting of hydroxyl, chlorine, bromine and fluorine; wherein the proportion of reactants may vary from about 5% molar excess of the tricarboxylic compound to about 70% molar excess of the primary diamino compound.

2. An insoluble, infusible and flexible resin obtained by further condensation and cross-linking of the polyamide of claim 1 at a temperature within the range of 125° C. to 500° C.

3. A soluble polyamide which is the polymeric condensation product of about equimolar quantities of methylene dianiline and the acid chloride of trimellitic anhydride.

4. A polyamide wire enamel composition comprising about 15% by weight of the polyamide of claim 3 dissolved in a mixture of N-methylpyrrolidone and xylene.

5. An electrical conductor coated with 2 to 14 layers of the enamel of claim 4, each layer having been cured at a temperature within the range of 200° C. to 500° C.

References Cited by the Examiner

UNITED STATES PATENTS 2,502,576 4/1950 Lincoln et al. ---------- 260—78
2,989,495 6/1961 Hare et al. ---------- 260—30.2

FOREIGN PATENTS 942,025 11/1963 Great Britain.

MORRIS LIEBMAN, *Primary Examiner.*

L. T. JACOBS, *Assistant Examiner.*

UNITED STATES PATENT OFFICE
Certificate

Patent No. 3,260,691                                                                                          Patented July 12, 1966

Edward Lavin, Albert H. Markhart, and James O. Santer

Application having been made by Edward Lavin, Albert H. Markhart, and James O. Santer, the inventors named in the patent above identified, and Monsanto Company, a corporation of Delaware, the assignee, for the issuance of a certificate under the provisions of Title 35, Section 256, of the United States Code, deleting the name of James O. Santer as a joint inventor, and a showing and proof of facts satisfying the requirements of the said section having been submitted, it is this 20th day of March 1973, certified that the name of the said James O. Santer is hereby deleted from the said patent as a joint inventor with the said Edward Lavin and Albert H. Markhart.

FRED W. SHERLING
*Associate Solicitor.*

Disclaimer 3,260,691.—*Edward Lavin*, Longmeadow, and *Albert H. Markhart*, Wilbraham, Mass. COATING COMPOSITIONS PREPARED FROM CONDENSATION PRODUCTS OF AROMATICS PRIMARY DIAMINES AND AROMATIC TRICARBOXYLIC COMPOUNDS. Patent dated July 12, 1966. Disclaimer filed June 13, 1973, by the assignee, *Monsanto Company*.

Hereby enters this disclaimer to claims 1 and 2 of said patent.

[*Official Gazette November 6, 1973.*]